June 13, 1972  ASAO OISHI ET AL  3,669,560

CONTROL DEVICE FOR STOPPING ROTATION OF WATER TURBINE

Filed Oct. 7, 1970  2 Sheets-Sheet 1

INVENTORS
ASAO OISHI
SHOZZO SASHINO

BY Craig, Antonelli, Stewart & Hill
ATTORNEYS

United States Patent Office 3,669,560
Patented June 13, 1972

3,669,560
CONTROL DEVICE FOR STOPPING ROTATION
OF WATER TURBINE
Asao Oishi and Shozzo Sashino, Hitachi, Japan, assignors
to Hitachi, Ltd., Tokyo, Japan
Filed Oct. 7, 1970, Ser. No. 78,810
Claims priority, application Japan, Oct. 9, 1969,
44/80,788, 44/80,789
Int. Cl. F01b 25/06
U.S. Cl. 415—41                                           2 Claims

ABSTRACT OF THE DISCLOSURE

The opening of a guide vane is locked or maintained in its present position at the time a water turbine is stopped upon removal of a load, and the guide vane is started to be closed after a time interval predetermined by the opening of the guide vane locked or in response to a predetermined rotational speed of the water turbine.

BACKGROUND OF THE INVENTION

The present invention relates to a device for closing a guide vane when a load of a water turbine is removed.

Prior art

When a load is removed during the operation, the rotational speed of a water turbine is suddenly increased, because the resistance due to the load of the water turbine is reduced. A governor is used for controlling a guide vane so as to reduce the flow of water into the water turbine in order to prevent the sudden increase in rotational speed. In the prior art, immediately after removal of the load, the guide vane is started to close at such a closure rate that both of the increase of the rotational speed of the water turbine and the pressure rise in a penstock may be suitably controlled. In the prior art system described, the closure time (the elapsed time from the initial movement of the guide vane to its complete closure) must be extended to an extreme extent especially when the length of the penstock is considerably longer. In other words, the longer the length of the penstock, the larger the amount of water is filled in the penstock so that the energy of the water becomes larger. Therefore, even a slight movement of the guide vane causes a considerable variation in pressure in the penstock so that the guide vane closure time must be sufficiently made longer. Even when the closure time may be made infinity, it is impossible to minimize the rotational speed and pressure rise below certain levels. Thus, the penstock must have the mechanical strength enough to withstand the pressure rise and a very expensive surge tank must be provided in some cases. It is seen that the prior art system is not economical.

The pressure rise in the penstock upon removal of the load are resulted from two causes. One is caused by the increase in flow resistance when the guide vane is closed while the other is caused by the increase of the flow resistance when the rotational speed of the water turbine is increased. Therefore, the prior art has proposed a system in which the opening of the guide vane is locked in its present position when the load is removed and then is gradually closed so as to suppress the pressure increase due to the closure of the guide vane. In this system, it is very important to select the elapsed time from the time the guide vane is locked in position upon removal of the load to the time the guide vane is started to be closed. As described above, a certain pressure rise is inevitable so that even when the locking time of the guide vane is made longer, only the pressure rise due to the closure of the guide vane may be prevented. That is, the pressure rise due to the increase of the rotational speed of the water turbine is not suppressed. Therefore, the best time for starting to close the guide vane is the time when the pressure rise due to the increase of the rotational speed of the water turbine starts to decrease (that is, the time when the guide vane may be started to close and the pressure rise due to closure of the guide vane is equal to or less than that caused by the initial increase of the rotational speed of the water turbine). At this time the pressure rise caused by the closure of the guide vane will not be increased in excess of the water pressure rise due to the initial increase of the rotational speed of the water turbine. Holding the guide vane opened in excess of said time will cause the loss of effective water and a longer time before the water turbine is stopped.

In brief, the time when the guide vane is started to close determines how effectively the water turbine may be stopped.

SUMMARY OF THE INVENTION

In brief, the present invention contemplates to maintain the opening of a guide vane when a load is removed for a predetermined time which is determined by the opening. After said predetermined time, the guide vane is started to close. Alternatively, the opening of a guide vane may be maintained until the rotational speed of a water turbine which is once increased upon removal of a load starts to decrease and then the closure of the guide vane may be started.

BRIEF DESCRIPTION OF THE DRAWINGS

Same parts are designated by same reference numerals throughout the figures.

DESCRIPTION OF THE PREFERRED EMBODIMENTS

Figure 1:
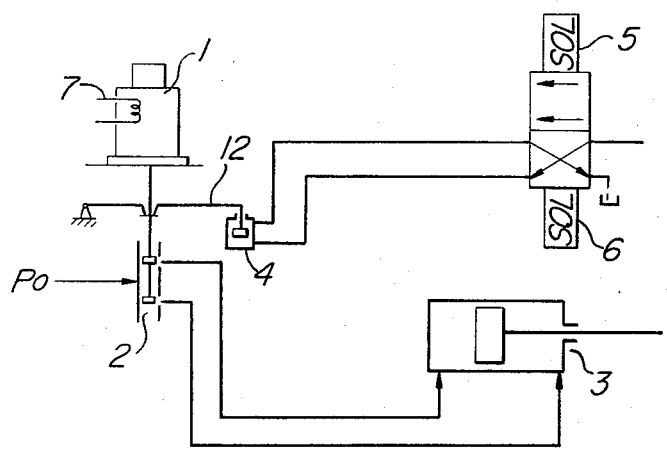
FIG. 1 is a schematic diagram illustrating one embodiment of the present invention.

Referring to FIG. 1, reference numeral 1 designates an actuator solenoid; 2, a hydraulic pilot valve of a standard two-land spool type; 3, a servomotor which functions as in the case of a conventional governor; 4, a lock piston connected to a lock lever 12; 5, a solenoid for locking the servomotor; 6, a solenoid for releasing the locked servomotor; and 7, a coil for actuating the pilot valve.

Figure 2:
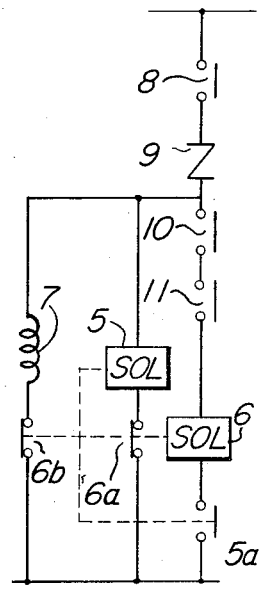
FIG. 2 is an electrical circuit diagram thereof.

Referring to FIG. 2 illustrating the electrical circuit of the first embodiment of the present invention; reference numeral 8 designates a relay which is adapted to be closed when a main circuit breaker is opened; 9, a position-responsive switch which is closed when the guide vane is opened in excess of the degree of opening in case of no-load; 10, a speed-variation-responsive relay which is closed when the rotational speed is in excess of a predetermined value $N_1$; 11, a relay for detecting the deceleration; and 5a, 6a and 6b, contacts.

Figure 3:
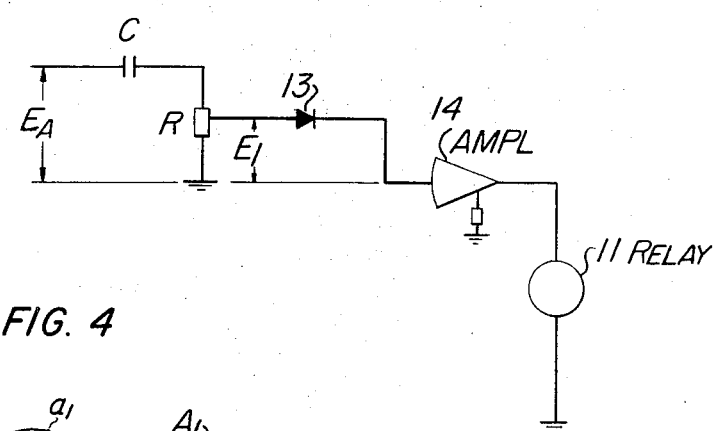
FIG. 3 is an electrical circuit diagram of a device for detecting the deceleration of a water turbine.

Referring to FIG. 3 illustrating the electrical circuit for detecting the deceleration point of the water turbine, reference numeral 13 designates a rectifier. When the rotational speed of the water turbine is varied, the voltage $E_A$ is varied and the voltage $E_1$ is generated and applied to an amplifier 14 so as to close the relay 11.

The oil under pressure $Po$ is admitted into the servomotor 3 through the pilot valve 2 by energizing the solenoid 1. The lock piston 4 serves to hold the pilot valve 2 in its neutral or equilibrium position. When the solenoid 5 is energized, the oil under pressure is forced into the lock piston and cylinder assembly 4 to thereby lock the servomotor in position. When the solenoid 6 is energized, the servomotor 3 is released from its locked position. The speed-responsive relay 10 as well as the deceleration detecting relay 11 are connected in series to the solenoid 6. The coil 7 for lifting the pilot valve and the solenoid 5 for locking the servomotor 3 are connected in parallel with the series circuit of the solenoid 6 and the two relays 10 and 11. The deceleration detecting relay 11 detects the point at which the rotational speed of the water turbine which is once increased when the load is removed starts to decelerate and the guide vane is closed through the solenoid 6, the lock piston 4, the pilot valve 2 and the servomotor 3.

Next the mode of operation of the first embodiment having the construction described above will be described in more detail.

When the main breaker is opened when the load is removed, the coils 5 and 7 are energized because both of the relay 8 and the position-responsive switch 9 are closed. Therefore the spool of the pilot valve 2 is lifted while the oil under pressure causes the piston 4 to move downwardly so that the pilot valve 2 is maintained in its equilibrium position by the lever 12. In consequence, the oil under pressure in the servomotor 3 which actuates the guide vane is locked so that the opening of the guide vane is locked accordingly. On the other hand, the rotational speed of the water turbine is increased once but is decelerated as the hydraulic pressure is stabilized. Therefore the deceleration detecting relay 11 is closed and the speed-responsive relay 10 is also closed so that the solenoid 6 is energized. In consequence, the oil under pressure within the lock piston and cylinder assembly 4 is discharged so that the pilot valve 2 is actuated. Therefore the servomotor 3 is released and actuates to close the guide vanes.

Figure 4:
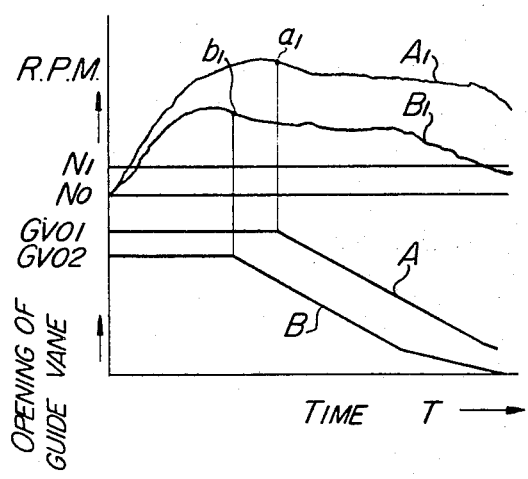
FIG. 4 is a graph illustrating the relation between the time and the variation in rotational speed of the water turbine after a load is removed, together with the degree of opening of the guide vane.

FIG. 4 illustrates the relation between the time and the rotational speed of the water turbine and the degree of opening of the guide vane. The curves $A_1$ and $B_1$ indicate the rotational speeds of the water turbine while the curves A and B, the degrees of opening of the guide vane. More specifically, the curves $A_1$ and A indicate the rotational speed and the degree of opening of the guide vane respectively when the degree of opening of the guide vane is GV01 when the load is removed while the curves B and $B_1$, those when the degree of opening of the guide vane is GV02 when the load is removed.

When the rotational speed of the water turbine is in excess of $N_1$, the speed-responsive relay 10 is actuated. The rotational speeds once increased start to decelerate at points $a_1$ and $b_1$ respectively at which the deceleration detecting relay 11 is actuated so that the solenoid 6 is energized, consequently, the oil under pressure in the lock piston and cylinder assembly 4 is discharged so that the guide vane is closed through the pilot valve and the servomotor 3.

From the foregoing description, it is seen that the guide vane is started to be closed in response to the detection of the deceleration of the rotational speed of the water turbine. The time or point at which the deceleration starts is dependent upon the degree of opening of the guide vane when the load is removed, which opening in turn is dependent upon the head and load when the load is removed. Therefore, the deceleration point may be detected from the head and the degree of opening of the guide vane when the load is removed.

Based upon the above observed fact, the second embodiment is made to previously determine the time interval from the time the load is removed to the time the guide vane is started to be closed.

Figure 5:
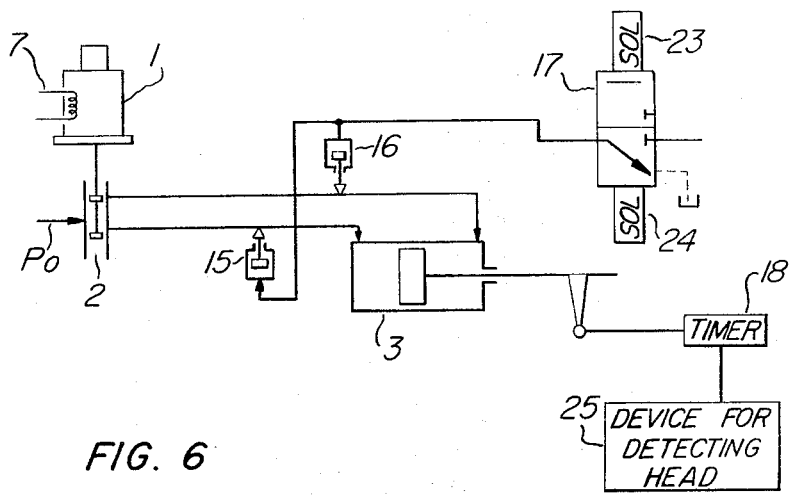
FIG. 5 is a schematic diagram of another embodiment of the present invention.
Figure 6:
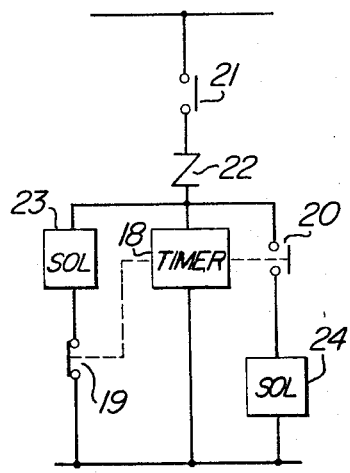
FIG. 6 is a diagram of an electrical circuit thereof.

Referring to FIG. 5, reference numerals 15 and 16 designate hydraulic valves for locking the servomotor in a desired position; 17, a solenoid-actuated valve for opening and closing the valves 15 and 16; 18, a timer controlling contact members 19 and 20 for a predetermined time interval according to the position of the servomotor 3, that is the degree of opening of the guide vane; 21, a relay actuated by the main circuit breaker interposed between the generator and the transmission line; 22, a position-responsive switch which is closed when the degree of opening of the guide vane is in excess of the opening in case of non-load; 23, a solenoid provided on the valve 17 for locking the servomotor; 24, a solenoid for releasing the servomotor from its locked position; and 25, a device for detecting the head and transmitting the signals representative of the detected head to the timer 18. The timer 18 accomplishes a suitable time lock by comparing these signals with the degree of opening of the guide vane.

In the second embodiment, the servomotor 3 is actuated by the oil under pressure supplied through the pilot valve 2 which in turn is actuated by the solenoid 1, so that the guide vane is opened or closed. The hydraulic locking valves 15 and 16 in the conduits inter-connecting the pilot valve 2 and the servomotor 3 are actuated by the solenoid-actuated valve 17. The solenoids 23 and 24 of the valve 17 are energized or de-energized by opening or closing the contact members 19 and 20 through the timer 18 coupled to the servomotor 3, so that the hydraulic valves 15 and 16 may be opened. Subsequently, the guide vane is closed by the servomotor 3 through the governor.

When the load of the generator is removed during the time the pump-turbine runner is functioning as the water-turbine, the solenoid 23 is energized because the main breaker (not shown) is opened before the guide vane is closed by the governor, so that the oil under pressure $Po$ is forced into the valves 15 and 16. Consequently, the conduits intercommunicating between the pilot valve and the actuator or servomotor are closed, that is the hydraulic circuit of the servomotor 3 is closed so that it is locked in position. The timer 18 causes the auxiliary contact members 19 to open and the auxiliary contact members 20 to close at a predetermined time corresponding to a degree of opening of the guide vane, so that the solenoid 23 is de-energized while the solenoid 24 is energized. Therefore, the oil under pressure is discharged from both of the hydraulic lock valves 15 and 16. Thus, the guide vane is closed by the governor.

Figure 7:
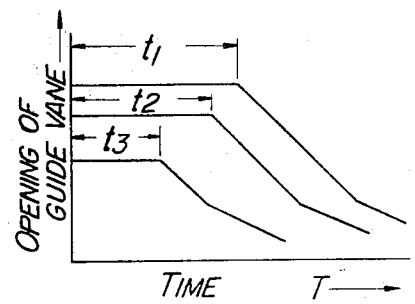
FIG. 7 is a graph illustrating the relation between the time and the degree of opening of the guide vane.

FIG. 7 illustrates the relation between the time during the guide vane being locked in position and its degree of opening. It is seen that the time intervals $t_1$, $t_2$ and $t_3$ are so selected that the smaller the opening of the guide vane, the shorter the time it is locked in position while the larger the opening of the guide vane, the longer the time it is locked in position.

According to the present invention, the guide vane is started to be closed immediately after the pressure rise caused by the closure of the guide vane becomes lower than that due to the increase of the rotational speed of the water turbine so that the time required for stopping the water turbine may be shortened and the loss of the effective water may be minimized.

What is claimed is:

1. A control device for stopping the rotation of a water turbine comprising
   means for detecting the removal of a load,
   means responsive to the removal of the load for locking a guide vane in its present position,
   means for detecting the start of deceleration of a water turbine,
   means for releasing said guide vane in locked position upon the start of deceleration of the water turbine, and means for closing said guide vane when said guide vane has been released.

2. A control device for stopping the rotation of a water turbine comprising means for detecting the removal of a load,
means responsive to the removal of the load for locking a guide vane in its present position,
means for setting a locking time for said guide vane in accordance with the head and a degree of opening of said guide vane when said load is removed,
means for releasing said guide vane after said locking time set is elapsed, and
means for closing said guide vane, when said guide vane has been released.

References Cited

FOREIGN PATENTS 631,450   3/1959   Canada ............. 415—41

C. J. HUSAR, Primary Examiner

U.S. Cl. X.R.

415—17